Oct. 23, 1951   H. W. WOODARD   2,572,796
WELDING METHOD AND APPARATUS
Filed June 23, 1948
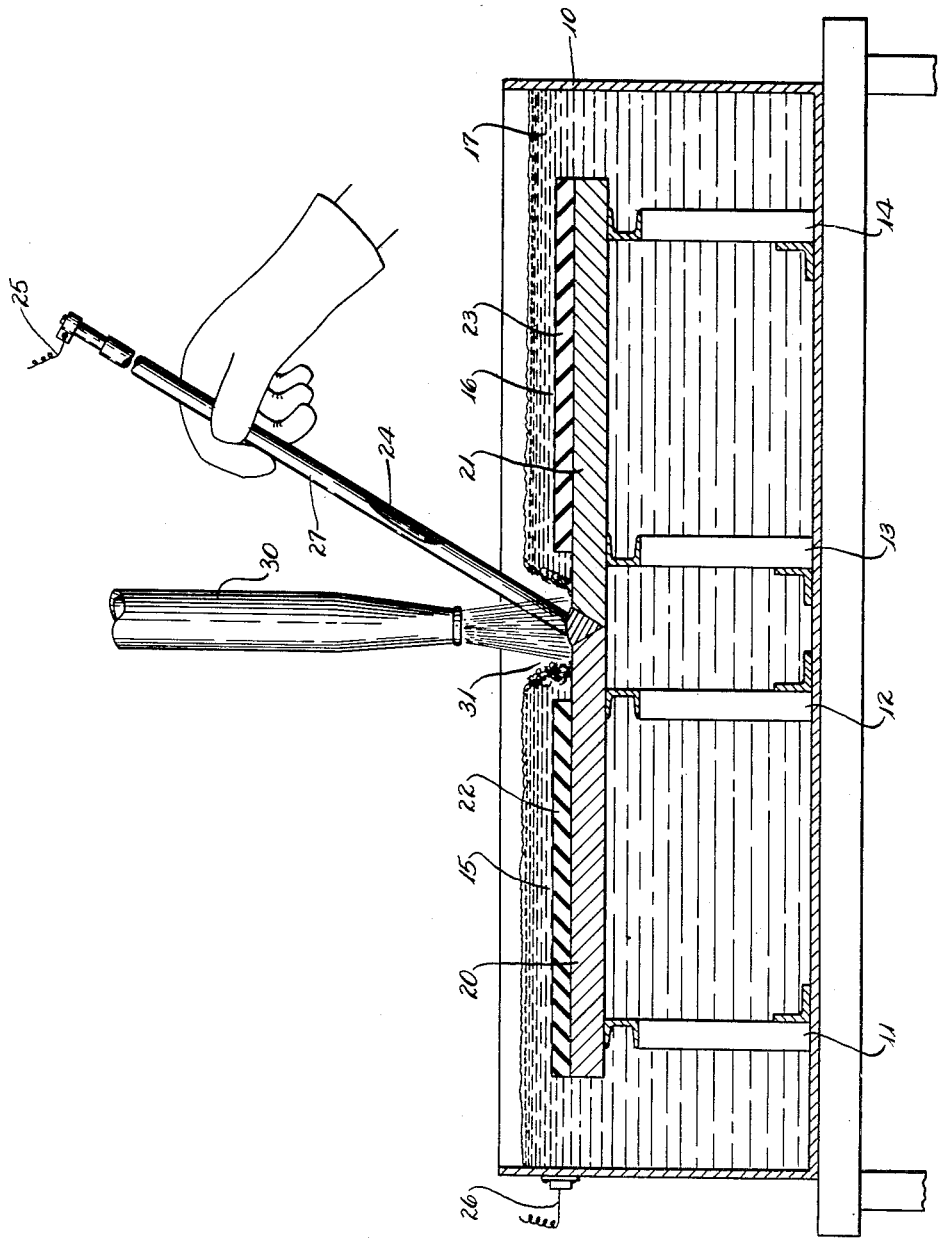
Inventor
Harry W. Woodard
By
Att Patented Oct. 23, 1951

2,572,796

UNITED STATES PATENT OFFICE 2,572,796

WELDING METHOD AND APPARATUS

Harry W. Woodard, Akron, Ohio, assignor to The B. F. Goodrich Company, New York, N. Y., a corporation of New York Application June 23, 1948, Serial No. 34,623

4 Claims. (Cl. 219—10)

This invention relates to welding, and is especially useful where it is desirable to weld portions of metal members to each other while they are submerged, as where it is desired to cool other portions of the members.

In the welding of metal members to each other it has often been desirable to avoid substantial rise of temperature of portions of the members closely adjacent to the weld as such rise in temperature might injure such adjacent portions as by drawing the temper thereof.

In the manufacture of articles partly of metal and partly of combustible material such as parts of rubber or other rubber-like material bonded or otherwise secured to the metals, it is sometimes convenient to bond the rubber-like material to one metal member and then to attach a second metal member to the first.

Heretofore attempts to weld such metal members having rubber-like material bonded thereto have often resulted in burning or otherwise damaging the rubber-like material due to substantial rise in temperature of the rubber-like material.

It is an object of the present invention to provide for cooling of the metal bodies and rubber-like material secured thereto except at the immediate area of the weld while welding the metal bodies together.

Other objects are to provide for immersion of the articles to be welded in a cooling bath while displacing the liquid of the bath immediate the area to be welded, to prevent overheating of parts of the articles remote from the weld, to support the articles to be welded while submerged, and to reduce current leakage.

These and other objects will appear from the following description and the accompanying drawings.

Of the drawings,

The sole figure is a sectional elevation of the bath with the articles to be welded supported therein and the welding apparatus in use.

Referring to the drawing, the numeral 10 designates a tank or container having supports 11, 12, 13, 14 for holding articles 15, 16 in the desired relation. A bath of liquid 17 is contained in the tank so as to cover the articles completely to the extent of at least about one-half inch. The article consists of metal portions 20, 21 to which are bonded portions 22, 23 of rubber-like material.

For welding the metals 20, 21 to each other, a welding rod 24 is connected to one pole of an electric generator as at 25, the other pole being connected to the metal tank 10, as at 26 and by way of the conductive supports 11, 12, 13, 14 to the metals 20, 21. Alternating current may be used if desired. The welding rod 24 is provided with an insulating coating 27 to prevent leakage of current. This coating may be of any impervious insulating material insoluble in water or other liquid employed in the bath and of such a nature as to be burned away as the rod is used. Rubber, varnish, or wax coatings may be employed for this purpose. The rod may have a coating of flux between the rod and the protective coating.

A jet tube 30 is connected to a supply of compressed air or other gas under pressure and is directed at the work where the work is touched by the welding rod or at the position of the arc. The gas under pressure displaces the liquid of the bath at the welding posiiton as at 31 exposing a small area of the metals at the weld to the atmosphere and permitting the welding at this position while other portions of the articles are completely submerged in the bath and are kept cool thereby.

It is preferred to use water for the bath, and a supply and drain may be provided so that the water is continuously changed in the bath for efficient cooling of the work.

In making a weld the metals to be united are supported in the desired relation to each other in the tank and the tank is filled submerging the metals. The air jet is directed at the desired position of the weld and forces the water away from that position. The welding rod is then grasped by the operator and an arc struck at the exposed position, whereupon welding is proceeded with while the jet of air continues to hold back the water.

The water surrounding the parts of the articles not exposed for welding prevents overheating of the articles and where rubber parts are present prevents burning of the rubber-like material.

The invention is also useful where heating, cutting, welding or other welding operations are required upon metal objects submerged in water to a great depth as the air jet nozzle may be submerged in the water and will provide a foreful displacement of the air at the position of the arc which will permit the development of high temperatures at the welding position.

Variations may be made without departing from the scope of the invention as it is defined by the following claims.

I claim:

1. Apparatus for welding an article without overheating portions of the article remote from the weld, said apparatus comprising a bath of cooling liquid, and a support in said bath below the surface of the liquid for holding the article at such elevation in the bath as to provide a depth of liquid thereover sufficiently shallow to permit localized displacement of the liquid at the position of the weld by a stream of gas directed against the upper surface of the article from a position above the liquid, said support being connected electrically to one pole of a source of electric current, a jet nozzle above the bath and directed at the surface in the region of the desired weld for providing the stream of gas and a welding electrode connected to the opposite source of electric current and positionable in arc-forming relation to the article at the position of localized displacement.

2. The method of welding an article comprising a metal member and a rubber body permanently secured to a portion thereof with a portion of the metal exposed, which method comprises immersing the article in a bath of cooling liquid, directing a jet of gas from a position above the liquid against the face of the liquid over an area of the metal member corresponding to the position of the desired weld on the exposed portions of the metal to displace the liquid over said exposed portion of said member while maintaining the displaced liquid over other portions of the article to protect them, positioning a welding electrode at the exposed metal portion, and subjecting the exposed metal portion to an arc by virtue of passing a welding current of electricity through said electrode and said article while holding them in arc-forming relation.

3. The method of welding an article comprising a metal member having an exposed margin and a rubber body permanently secured thereto adjacent said margin, which method comprises immersing the article in a bath of cooling liquid, directing a jet of gas from a position above the liquid against the face of the liquid over said margin at the position of the desired weld to displace the liquid over an area of said margin while maintaining the displaced liquid over said rubber body to protect it, positioning a welding electrode at the exposed margin, and subjecting the exposed margin to an arc by virtue of passing a welding current of electricity through said electrode and said article while holding them in spaced-apart relation while said liquid is so displaced from said margin and maintained over said rubber body.

4. The method of welding an article comprising a metal member having an exposed margin and a rubber body permanently secured thereto adjacent said margin to another article comprising a metal member, which method comprises immersing said articles in a bath of cooling liquid with the exposed margin of the one article in proximity to the metal member of the other article, directing a jet of gas from a position above the liquid against the face of the liquid over said margin at the position of the desired weld to displace the liquid thereover while maintaining the displaced liquid over other portions of the articles to protect said other portions including said rubber body, positioning a welding electrode at the exposed margin and subjecting the exposed metal of the articles to an arc by virtue of passing a welding current of electricity through said electrode and said articles as a group while holding said electrode in spaced-apart relation to said group, while said liquid is so displaced from said margin and maintained over said rubber body.

HARRY W. WOODARD.

REFERENCES CITED

The following references are of record in the file of this patent:

UNITED STATES PATENTS

| Number | Name | Date |
| --- | --- | --- |
| 1,055,261 | Ellinger | Mar. 4, 1913 |
| 1,309,696 | Roberts et al. | July 15, 1919 |
| 1,324,337 | Chapman et al. | Dec. 9, 1919 |
| 1,651,547 | Rich | Dec. 6, 1927 |
| 1,687,081 | Chapman | Oct. 9, 1928 |
| 2,223,312 | Briggs | Nov. 26, 1940 |
| 2,288,068 | Brebeck | June 30, 1942 |
| 2,371,945 | Barbeck | Mar. 20, 1945 |
| 2,455,441 | Peillon | Dec. 7, 1948 |

FOREIGN PATENTS

| Number | Country | Date |
| --- | --- | --- |
| 161,815 | Great Britain | Apr. 21, 1921 |